May 17, 1966 W. J. ROSENBLOOM 3,251,879
PRODUCTION OF LOW-BIURET UREA CRYSTALS
Filed June 19, 1963
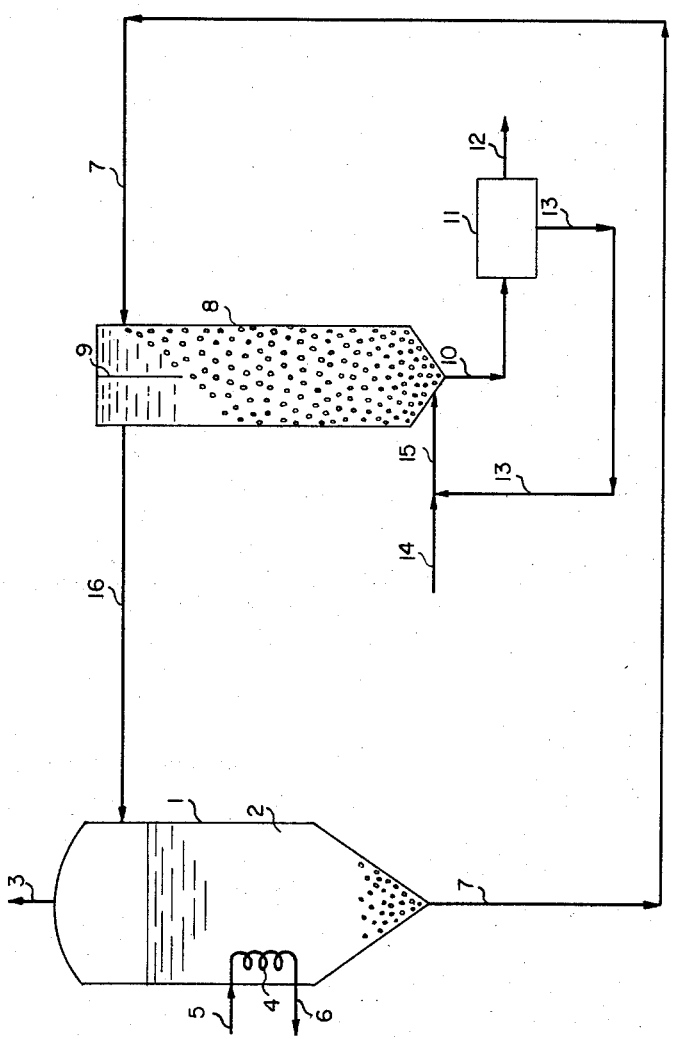
WILLIAM J. ROSENBLOOM
INVENTOR.
BY J. T. Chaboty United States Patent Office 3,251,879
Patented May 17, 1966

3,251,879
PRODUCTION OF LOW-BIURET UREA CRYSTALS
William J. Rosenbloom, Westport, Conn., assignor to Chemical Construction Corporation, New York, N.Y., a corporation of Delaware
Filed June 19, 1963, Ser. No. 289,093
8 Claims. (Cl. 260—555)

This invention relates to the production of urea crystals having a low or negligible biuret content. A process of urea crystallization from high-biuret solution, followed by elutriation of the resulting crystal slurry employing make-up aqueous urea solution in a counter-current crystal wash step, results in the production of solid crystalline urea having a negligible content of entrained or occluded biuret.

The problem of biuret formation is widely encountered in the production of urea. Biuret is a urea decomposition product which readily forms when aqueous urea solution or molten urea melt is heated. The conventional urea synthesis processes produce an aqueous urea solution containing about 70% urea and 30% water. In order to produce solid urea in the crystal form, the aqueous urea solution is concentrated in a vacuum crystallizer or other apparatus in which water is removed by evaporation. A slurry of crystals in saturated mother liquor is produced, and solid crystals are separated from the slurry in a centrifuge or other filtering apparatus. The evaporative heating step, or the retention of the urea at an elevated temperature for a time interval, causes some of the urea to undergo decomposition or polymerization, thereby forming a variety of by-product impurities. A principal impurity, and one which is highly objectionable in certain urea usages, is biuret. Biuret is formed at elevated temperature by the combination of two urea molecules, with the splitting off of a molecule of ammonia.

One of the important techniques of urea usage involves the dispersal of urea onto the foliage of growing plants or trees for fertilizer purposes. In such usage, the presence of biuret in the urea produces highly adverse effects on the foliage. Consequently, a special grade of urea with very low biuret content is marketed for such usages. This urea is termed "foliar-grade," and is usually sold with a guaranteed maximum biuret content of 0.35%.

There are a variety of other urea usages in which low biuret content is required. Principal among these is the usage of urea in the production of synthetic plastics and resins, where the general impurities level must also be kept low. A small amount of urea is also consumed in pharmaceuticals, and here a stringent limitation as to content of biuret and other impurities is imposed.

The crystallization of urea from an aqueous solution containing biuret actually results in the formation of substantially pure crystals of urea under normal operating conditions. In general, the presence of biuret in the final solid urea crystals is generally due to a surface phenomenon, principally the freezing up of mother liquor on the crystals during solids recovery. Thus, one prior art procedure for the recovery of biuret-free urea crystals involves maintenance of the crystals at an elevated temperature during removal of crystals from the slurry. This condition is difficult to maintain in practice due to apparatus design considerations, and in addition heating of the crystals tends to result in further in situ formation of biuret within the originally pure urea crystals. Another prior art approach involves removal of the surface layer of high-biuret material by multiple washing of the solid urea crystals with dilute wash solution or water. This procedure is also relatively undesirable, since a large amount of dilute aqueous urea solution is produced, which must be subsequently reconcentrated.

In the present invention, substantially pure urea crystals are produced by means of a unique procedure. A slurry of pure urea crystals in high-biuret mother liquor is produced by crystallization of urea from a saturated aqueous solution containing biuret. The crude slurry is discharged into the upper portion of a crystal settling zone or elutriator, which is maintained in a vertically oriented settling chamber or other suitable apparatus. Makeup concentrated aqueous urea solution, derived from a urea synthesis process and of low biuret content, is passed into the lower portion of the crystal settling zone. The solid urea crystals move downward counter-current to the upflowing liquid phase, and the resulting liquid solution containing substantially all of the biuret originally in the crude slurry is removed from the upper portion of the settling zone and is recycled to the crystallization unit. A final slurry is withdrawn from the bottom of the crystal settling zone, consisting of urea crystals in a solution which is substantially free of biuret. Solid urea crystals are separated from the final slurry, and the residual liquid phase is preferably recycled to the bottom of the crystal settling zone. The final solid urea crystal product is essentially free of biuret.

The process of the present invention possesses several noteworthy advantages. A solid crystal urea product is produced which is remarkably free of biuret. This solid urea product may be marketed as such, or may alternatively be remelted and prilled to produce low-biuret prills. Dilution of the system with aqueous wash water is avoided, since the makeup urea solution employed in the crystal settling zone is a concentrated aqueous urea solution. The crystallization unit may be operated with a relatively high concentration of biuret, which may be controlled by periodic purging of a portion of the liquid phase from the crystallizer or in any other conventional manner, and process upsets such as surging of process streams is readily accommodated, since a net upward velocity of the liquid phase is always maintained in the crystal settling zone and consequently high biuret mother liquor cannot penetrate to the bottom of the settling zone. Finally, temperature control is not critical in slurry dewatering, since complete biuret removal is accomplished by a physical elutriation, in which temperature is not a critical factor. Any mother liquor from the final crystal slurry which may deposit on the solid urea crystals as a coating during dewatering is essentially free of biuret and consequently the prevention of solidification of mother liquor onto the crystals is not a critical consideration in the process of the present invention.

It is an object of the present invention to produce biuret-free urea crystals.

Another object is to elutriate urea crystals in a novel manner, so as to separate entrained high-biuret mother liquor from the crystals.

A further object is to prevent the deposition of biuret on the surface of solid urea crystals.

An additional object is to employ makeup aqueous urea solution in a novel manner as an elutriating agent to separate high-biuret mother liquor from pure urea crystals.

Still another object is to elutriate urea crystals by maintenance of a crystal settling zone in which the crystals move downwards counter-current to a rising wash stream of low biuret content.

An object is to control solids content in a urea crystal slurry for optimum centrifuging.

These and other objects and advantages of the present invention will become evident from the description which follows. Referring to the figure, evaporator-crystallizer 1 contains a concentrated aqueous urea solution 2. Unit 1 is preferably maintained under vacuum by means of vacuum line 3, which serves to promote boiling and evaporation of water vapor at a relatively low temperature level and thus reduces biuret formation. The solution 2 is typically a saturated aqueous urea solution at a temperature in the range of 130° F. to 160° F. The solution also usually contains up to 5% biuret. The solution is heated by steam coil 4 which is provided with steam via 5, with condensate removal via 6. Evaporation of solution 2 thus results in the crystallization of solid urea, which settles to the bottom of unit 1 and is withdrawn via 7. A portion of solution 2 may be periodically purged from unit 1 in a conventional manner, not shown, in order to reduce biuret concentration by eliminating any possible build-up of excess biuret in the evaporator-crystallizer 1.

Stream 7 is a slurry, consisting of solid urea crystals entrained in saturated mother liquor of high biuret content. Stream 7 is passed into elutriator 8, which is a vertically oriented vessel in which separation of the urea crystals from high-biuret mother liquor is achieved in a novel manner. As stream 7 is passed into unit 8, the stream flow is preferably diverted by baffle means such as 9, so as to direct the crystals in a downward direction. The crystals now settle downwards through unit 8, flowing counter-current to a rising liquid phase derived in a manner to be described infra.

The rising liquid phase is a saturated aqueous urea solution, typically at a temperature in the range of 130° F. to 200° F. The original high-biuret mother liquor is effectively elutriated and displaced from contact with the solid urea crystals. The liquid phase in the lower part of unit 8 typically has a maximum biuret content of 0.6%, and thus the final aqueous slurry withdrawn via 10 from the bottom of unit 8 consists of solid urea crystals entrained in a saturated aqueous urea solution of low biuret content. Stream 10 is passed to separator 11, which is a conventional apparatus for separating slurries into solid and liquid phases. Thus unit 11 may typically consist of a centrifuge. The solid urea crystals, now substantially free of biuret, are withdrawn from unit 11 via 12. Product stream 12 may be directly utilized as biuret-free urea crystals, or alternatively stream 12 may be separately remelted in means not shown to form a urea melt. The urea melt may then be prilled to provide low-biuret urea prills.

The low-biuret mother liquor present in stream 10 is recovered from unit 11 via 13, and is preferably recycled to the lower portion of unit 8. Thus, stream 13 is combined with makeup aqueous urea solution 14, which is derived from a urea synthesis process and is low in biuret, typically containing about 70% urea and 30% water. The combined stream 15 is passed into the lower portion of unit 8, and a net upward flow of the liquid phase in unit 8 is achieved. A major novel factor in the process of the present invention thus involves the usage of aqueous urea solution 14 derived from a urea synthesis process as an elutriating agent for contact with urea crystal slurry, since in the prior art stream 14 was merely passed directly into unit 1.

The rising liquid phase in unit 8 thus mixes with the mother liquor derived from stream 7. The combined liquid phase is withdrawn from the upper portion of unit 8 via 16, and is passed to unit 1 for concentration and crystallization of its urea content.

Alternative modifications within the scope of the present invention will occur to those skilled in the art. Thus, for example, in some cases stream 14 may be a more dilute aqueous urea solution, depending on the particular urea synthesis process from which the solution is derived and other factors. Thus it may be possible in some cases to pass stream 14 into unit 8 as the sole elutriating stream, and to combine stream 13 with stream 16 thus passing stream 13 directly to unit 1. This alternative would be advantageous since the biuret content of the liquid phase in the lower portion of unit 8 would thus be lowered to a minimum value equivalent to the biuret concentration of stream 14 itself.

The diameter of elutriator 8, and the subsequent net upward velocity of the liquid phase, will be suitably selected in any particular instance to provide optimum concentration of solids in the slurry 10 which will be substantially higher than the original solids concentration in the slurry 7 withdrawn from crystallizer 1. This aspect of the process of the present invention provides another significant advantage, since centrifuge 11 is thus significantly smaller than any centrifuge which would be applied to the recovery of crystals from slurry 7.

An example of an industrial application of the process of the present invention will now be described.

*Example*

The process of the present invention was proposed for application to an industrial facility having an output of 25,000 lbs./hr. of crystal urea. The crystallizer was operated under vacuum at a temperature of 135° F., and crystal urea was produced from a saturated aqueous solution which also contained 4% biuret. A crystal slurry was withdrawn from the crystallizer at the rate of 50 gals./min., and passed to the upper portion of the elutriator. The crystals in the slurry descended through the elutriator at a rate of 0.5 ft./min., counter-current to a rising liquid phase having an upward velocity of 1 ft./min. and a temperature of 170° F. The liquid phase biuret content at the bottom of the elutriator was 0.4%, consequently the purified crystal slurry which was withdrawn from the bottom of the elutriator was substantially free of biuret. This purified slurry was centrifuged, and pure solid urea crystals were withdrawn as product. The liquid phase separated from the slurry in the centrifuge was combined with 20 gals./min. of makeup aqueous urea solution derived from a urea synthesis process, and the combined solution was passed into the bottom of the elutriator. Net liquid overflow from the top of the elutriator, containing the biuret content originally in the crude slurry, was recycled to the crystallizer.

I claim:

1. A process for production of solid crystalline urea of low biuret content which comprises crystallizing substantially pure urea crystals from an aqueous solution containing dissolved urea and biuret, withdrawing a first slurry from said solution comprising solid urea crystals entrained in mother liquor of high biuret content, elutriating the crystals in said first slurry by passing said first slurry into the upper portion of a crystal settling zone comprising a body of aqueous urea solution and passing make-up aqueous urea solution of low biuret content into the lower portion of said zone, whereby the solid urea crystals contained in said slurry move downwards in said zone counter-current to upflowing aqueous urea solution of low biuret content, recycling aqueous urea solution from the upper portion of said zone to the crystallization step, withdrawing a second slurry comprising solid urea crystals entrained in aqueous urea solution of low biuret content from the lower portion of said settling zone, and separating solid urea crystals substantially free of biuret from said second slurry.

2. The process of claim 1, in which the aqueous urea solution contained in said second slurry is recycled to the lower portion of said settling zone, after separation of solid urea crystals from said second slurry.

3. The process of claim 2, in which said aqueous urea solution is combined with said makeup aqueous urea solution of low biuret content, and the combined solution is passed to the lower portion of said settling zone.

4. The process of claim 1, in which a sub-atmospheric pressure is maintained over said aqueous solution containing urea and biuret, during said crystallization of solid urea crystals.

5. The process of claim 1, in which said downward movement of solid urea crystals in said settling zone is carried out by providing baffle means for fluid flow diversion in said settling zone.

6. A process for production of solid crystalline urea of low biuret content which comprises crystallizing substantially pure urea crystals from a saturated aqueous urea solution at a temperature in the range of 130° F. to 160° F. and a sub-atmospheric pressure, said solution also containing up to 5% biuret, withdrawing a crude slurry from the crystallization zone comprising solid urea crystals entrained in mother liquor, elutriating the crystals in said crude slurry by passing said slurry downwards through a settling zone comprising a body of aqueous urea solution, whereby said solid urea crystals pass downwards counter-current to an upwardly flowing liquid phase maintained at a temperature in the range of 130° F. to 200° F., said liquid phase comprising make-up aqueous urea solution of low biuret content, recycling the resulting liquid phase containing dissolved biuret from the top of said settling zone to said crystallizing zone, withdrawing a purified slurry from the bottom of the settling zone comprising solid urea crystals entrained in aqueous urea solution having a maximum of 0.6% biuret content, and separating solid urea crystals substantially free of biuret from said purified slurry.

7. The process of claim 6, in which the aqueous urea solution remaining after separation of solid urea crystals from said purified slurry is recycled to the lower portion of said settling zone.

8. A process for production of solid crystalline urea of low biuret content which comprises crystallizing substantially pure urea crystals from an aqueous solution containing dissolved urea and biuret, withdrawing a crude slurry from said solution comprising solid urea crystals entrained in mother liquor of high biuret content, elutriating the crystals in said crude slurry by passing said crude slurry into the upper portion of a crystal settling zone comprising a body of aqueous urea solution, whereby the solid urea crystals contained in said slurry move downwards in said zone counter-current to upflowing aqueous urea solution of low biuret content, withdrawing a refined slurry comprising solid urea crystals entrained in aqueous urea solution of low biuret content from the lower portion of said settling zone, separating said refined slurry into product solid urea crystals substantially free of biuret and residual aqueous urea solution, recycling said residual aqueous urea solution together with make-up urea solution of low biuret content to the lower portion of said zone, and recycling aqueous urea solution containing dissolved biuret from the upper portion of said zone to the crystallization step.

References Cited by the Examiner

UNITED STATES PATENTS 2,663,731  12/1953  Michelitsch _____ 260—555

FOREIGN PATENTS 1,127,788  12/1956  France.

NICHOLAS S. RIZZO, *Primary Examiner.*

HENRY R. JILES, *Examiner.*